US010884342B2

(12) United States Patent
Maassen et al.

(10) Patent No.: US 10,884,342 B2
(45) Date of Patent: Jan. 5, 2021

(54) METHOD AND APPARATUS FOR PREDICTING PERFORMANCE OF A METROLOGY SYSTEM

(71) Applicant: ASML NETHERLANDS B.V., Veldhoven (NL)

(72) Inventors: Martinus Gerardus Maria Johannes Maassen, San Francisco, CA (US); Reinder Teun Plug, Eindhoven (NL); Kaustuve Bhattacharyya, Veldhoven (NL)

(73) Assignee: ASML Netherlands B.V., Veldhoven (NL)

(*) Notice: Subject to any disclaimer, the term of this patent is extended or adjusted under 35 U.S.C. 154(b) by 17 days.

(21) Appl. No.: 15/771,585

(22) PCT Filed: Oct. 7, 2016

(86) PCT No.: PCT/EP2016/073995
§ 371 (c)(1),
(2) Date: Apr. 27, 2018

(87) PCT Pub. No.: WO2017/080727
PCT Pub. Date: May 18, 2017

(65) Prior Publication Data
US 2018/0314160 A1 Nov. 1, 2018

(30) Foreign Application Priority Data
Nov. 11, 2015 (EP) .................... 15194071

(51) Int. Cl.
G03F 7/20 (2006.01)
G06F 30/39 (2020.01)
G06F 119/18 (2020.01)

(52) U.S. Cl.
CPC .......... G03F 7/705 (2013.01); G03F 7/70625 (2013.01); G03F 7/70991 (2013.01); G06F 30/39 (2020.01); G06F 2119/18 (2020.01)

(58) Field of Classification Search
CPC .... G03F 7/705; G03F 7/70625; G03F 7/7091; G03F 7/70991; G06F 17/5068; G06F 2217/12; G06F 30/39; G06F 2119/18
See application file for complete search history.

(56) References Cited

U.S. PATENT DOCUMENTS 6,593,045 B2 * 7/2003 Sato .................... G01N 21/9501
118/56
6,788,985 B2 * 9/2004 Mitsutake .............. G06Q 30/06
700/291
(Continued)

OTHER PUBLICATIONS

International Search Report and Written Opinion dated Dec. 7, 2016 in corresponding International Patent Application No. PCT/EP2016/073995.

(Continued)

Primary Examiner — Naum Levin
(74) Attorney, Agent, or Firm — Pillsbury Winthrop Shaw Pittman, LLP

(57) ABSTRACT

A metrology system can be integrated within a lithographic apparatus to provide integrated metrology within the lithographic process. However, this integration can result in a throughput or productivity impact of the whole lithographic apparatus which can be difficult to predict. It is therefore proposed to acquire throughput information associated with a throughput of a plurality of substrates within a lithographic apparatus, the throughput information including a throughput parameter, and predict, using a throughput simulator, a throughput using the throughput parameter as an input parameter. The throughput simulator may be calibrated using the acquired throughput information. The impact of at (Continued)

least one change of a throughput parameter on the throughput of the lithographic apparatus may be predicted using the throughput simulator.

20 Claims, 5 Drawing Sheets

(56) References Cited

U.S. PATENT DOCUMENTS

| | | | | |
|---|---|---|---|---|
| 7,089,144 | B2* | 8/2006 | Mosher | G01M 99/00 |
| | | | | 368/89 |
| 7,230,723 | B2* | 6/2007 | Yamaguchi | G01N 23/2251 |
| | | | | 250/310 |
| 7,257,502 | B1 | 8/2007 | Qu et al. | |
| 7,346,413 | B2* | 3/2008 | Bortnick | G06Q 10/10 |
| | | | | 700/104 |
| 7,406,638 | B2* | 7/2008 | Clark | G01R 31/31926 |
| | | | | 714/724 |
| 7,599,042 | B2* | 10/2009 | Miyata | H01L 21/67276 |
| | | | | 355/27 |
| 7,873,206 | B2* | 1/2011 | Takagi | G03F 7/70525 |
| | | | | 382/151 |
| 8,515,567 | B2* | 8/2013 | Wang | G05B 13/024 |
| | | | | 438/16 |
| 9,360,434 | B2* | 6/2016 | Nakahira | G01N 21/8806 |
| 10,012,599 | B2* | 7/2018 | Wells | G01N 21/9501 |
| 10,095,121 | B2* | 10/2018 | Holovinger | H01L 22/12 |
| 2002/0009658 | A1 | 1/2002 | Sato et al. | |
| 2005/0060622 | A1* | 3/2005 | Clark | G01R 31/31926 |
| | | | | 714/724 |
| 2006/0074503 | A1 | 4/2006 | Purdy | |
| 2006/0209837 | A1* | 9/2006 | Lee | H04L 49/90 |
| | | | | 714/748 |
| 2008/0298670 | A1* | 12/2008 | Nakagaki | G06T 7/0004 |
| | | | | 382/149 |
| 2011/0261190 | A1* | 10/2011 | Nakagaki | G06T 7/001 |
| | | | | 348/126 |
| 2018/0101945 | A1* | 4/2018 | Stone | G06T 7/0004 |

OTHER PUBLICATIONS

Korean Office Action issued in corresponding Korean Patent Apploiation No. 10-2018-7015980, dated Nov. 25, 2019.

* cited by examiner

METHOD AND APPARATUS FOR PREDICTING PERFORMANCE OF A METROLOGY SYSTEM

CROSS-REFERENCE TO RELATED APPLICATIONS

This application is the U.S. national phase entry of PCT patent application no. PCT/EP2016/073995, which was filed on Oct. 7, 2016, which claims the benefit of priority of European patent application No. 15,194,071.5, which was filed on Nov. 11, 2015, and which is incorporated herein in its entirety by reference.

BACKGROUND

Field of the Invention

The present invention relates to methods of manufacture of products such as semiconductor devices using lithographic techniques. More specifically it relates to a method and apparatus for predicting performance of a metrology system, particularly a metrology system which forms part of an integrated lithographic apparatus.

Background Art

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g., including part of, one, or several dies) on a substrate (e.g., a silicon wafer). Multiple layers, each having a particular pattern and material composition, are applied to define functional devices and interconnections of the finished product.

Current and next generation processes often rely on so-called multiple patterning techniques to produce device features having dimensions far smaller than can be printed directly by the lithographic apparatus. Multiple patterning steps, each having its own mask or reticle, are performed to define a desired device pattern in a single layer on the substrate. Many different examples of multiple patterning are known. In some processes, a regular, grid structure is formed as a basis for the desired device pattern. Then using a circuit-specific mask pattern, lines that form the grid structure are cut at specific locations to separate the lines into individual segments. The grid structure may be exceptionally fine in dimensions, with a pitch in the tens or even teens of nanometers.

In a lithographic process, it is desirable frequently to make measurements of structures created, e.g., for process control and verification. Various tools for making such measurements are known, including scanning electron microscopes, which are often used to measure critical dimension (CD), and specialized tools to measure overlay (the accuracy of alignment of two layers of a substrate) or focus. Final performance of manufactured device may depend critically on the accuracy of positioning and dimensioning of the cut mask relative to the grid structure. (The cut mask in this context is what defines the circuit-specific locations at which the grid structure is modified to form functional circuits). Overlay error may cause cutting or other modification to occur in a wrong place. Dimensional (CD) errors may cause cuts be too large, or too small (in an extreme case, cutting a neighboring grid line by mistake, or failing to cut the intended grid line completely).

Other performance parameters of the lithographic process may be also of interest, for example in optical lithography parameters of focus and exposure dose may also require measuring.

It is proposed that lithographic apparatuses comprise integrated metrology systems able to make such measurements of performance parameters. However, integration of such metrology systems can have a throughput impact on the lithographic apparatus as a whole or on the metrology system. The integration may also have an impact on the sampling performance, i.e. the quantity of successfully sampled substrates, of the lithographic apparatus. Such impacts may be difficult to predict.

SUMMARY OF THE INVENTION

It is desirable to better predict a throughput and/or sampling performance impact of integrated metrology on lithographic systems.

In a first aspect of the invention, there is provided a method of predicting the throughput of a metrology system in a lithographic apparatus comprising the metrology system, the method comprising the steps of:

acquiring throughput information associated with a throughput of a plurality of substrates within the lithographic apparatus, said throughput information comprising a throughput parameter;

Predicting the throughput of the metrology system using a throughput simulator using the throughput parameter as input parameter.

In one embodiment the throughput simulator is calibrated using the throughput information. In another embodiment the throughput simulator predicts the throughput impact of at least one change of a throughput parameter.

Further aspects, features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Embodiments of the invention will now be described, by way of example, with reference to the accompanying drawings in which.

DETAILED DESCRIPTION

Before describing embodiments of the invention in detail, it is instructive to present an example environment in which embodiments of the present invention may be implemented.

Figure 1:
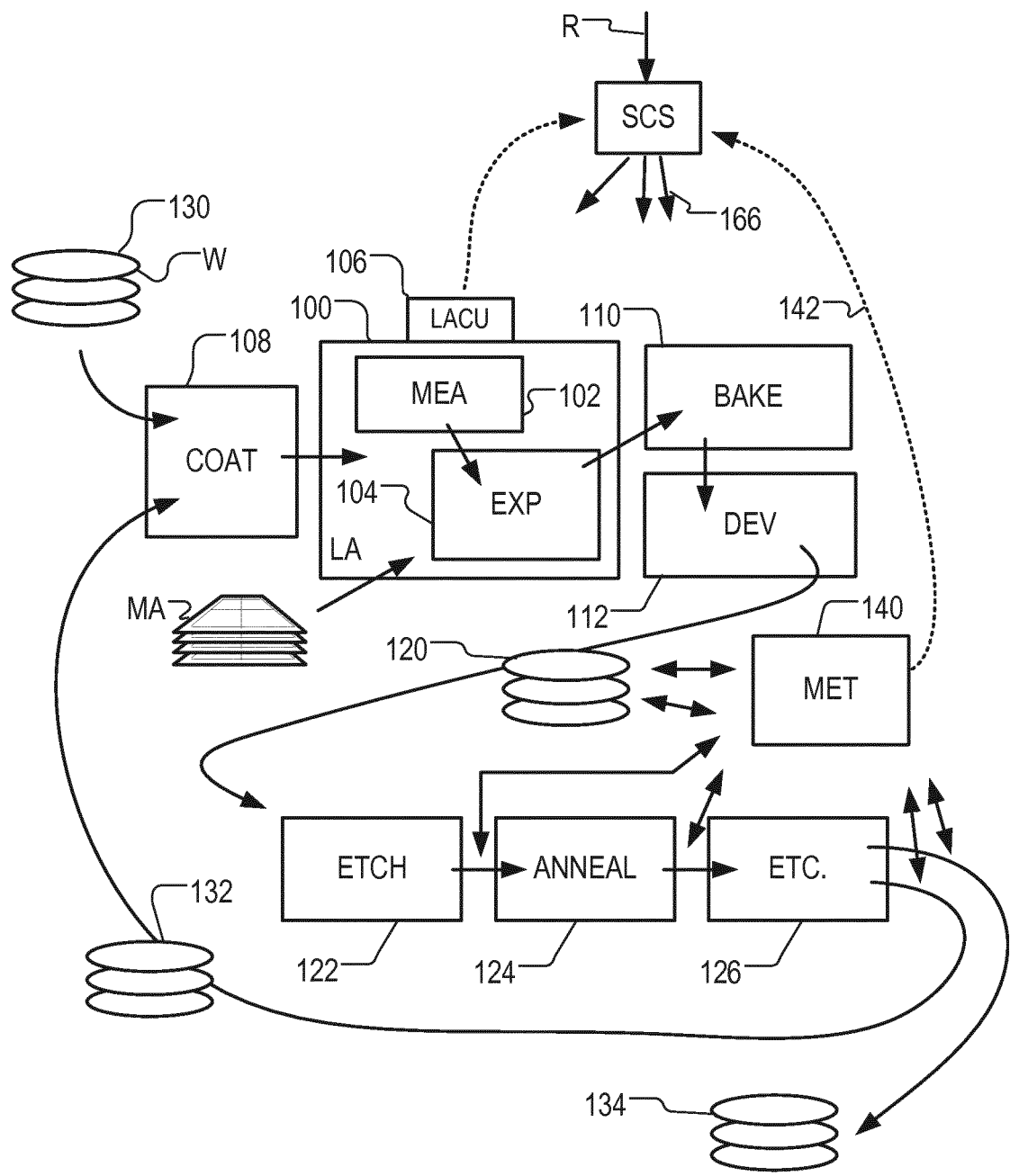
FIG. 1 depicts a lithographic apparatus together with other apparatuses forming a production facility for semiconductor devices.

FIG. 1 at 100 shows a lithographic tool LA as part of an industrial production facility implementing a high-volume, lithographic manufacturing process. In the present example, the manufacturing process is adapted for the manufacturing of semiconductor products (integrated circuits) on substrates such as semiconductor wafers. The skilled person will appreciate that a wide variety of products can be manufactured by processing different types of substrates in variants of this process. The production of semiconductor products is used purely as an example which has great commercial significance today.

Within the lithographic tool (or "litho tool" 100 for short), a measurement station MEA is shown at 102 and an exposure station EXP is shown at 104. A control unit LACU is shown at 106. In this example, each substrate visits the measurement station and the exposure station to have a pattern applied. In an optical lithographic apparatus, for example, a projection system is used to transfer a product pattern from a patterning device MA onto the substrate using conditioned radiation and a projection system. This is done by forming an image of the pattern in a layer of radiation-sensitive resist material.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. The patterning MA device may be a mask or reticle, which imparts a pattern to a radiation beam transmitted or reflected by the patterning device. Well-known modes of operation include a stepping mode and a scanning mode. As is well known, the projection system may cooperate with support and positioning systems for the substrate and the patterning device in a variety of ways to apply a desired pattern to many target portions across a substrate. Programmable patterning devices may be used instead of reticles having a fixed pattern. The radiation for example may include electromagnetic radiation in the deep ultraviolet (DUV) or extreme ultraviolet (EUV) wavebands. The present disclosure is also applicable to other types of lithographic process, for example imprint lithography and direct writing lithography, for example by electron beam.

The lithographic apparatus control unit LACU controls all the movements and measurements of various actuators and sensors to receive substrates W and reticles MA and to implement the patterning operations. LACU also includes signal processing and data processing capacity to implement desired calculations relevant to the operation of the apparatus. In practice, control unit LACU will be realized as a system of many sub-units, each handling the real-time data acquisition, processing and control of a subsystem or component within the apparatus.

Before the pattern is applied to a substrate at the exposure station EXP, the substrate is processed in at the measurement station MEA so that various preparatory steps may be carried out. The preparatory steps may include mapping the surface height of the substrate using a level sensor and measuring the position of alignment marks on the substrate using an alignment sensor. The alignment marks are arranged nominally in a regular grid pattern. However, due to inaccuracies in creating the marks and also due to deformations of the substrate that occur throughout its processing, the marks deviate from the ideal grid. Consequently, in addition to measuring position and orientation of the substrate, the alignment sensor in practice must measure in detail the positions of many marks across the substrate area, if the apparatus is to print product features at the correct locations with very high accuracy. The apparatus may be of a so-called dual stage type which has two substrate tables, each with a positioning system controlled by the control unit LACU. While one substrate on one substrate table is being exposed at the exposure station EXP, another substrate can be loaded onto the other substrate table at the measurement station MEA so that various preparatory steps may be carried out. The measurement of alignment marks is therefore very time-consuming and the provision of two substrate tables enables a substantial increase in the throughput of the apparatus. If the position sensor IF is not capable of measuring the position of the substrate table while it is at the measurement station as well as at the exposure station, a second position sensor may be provided to enable the positions of the substrate table to be tracked at both stations. Lithographic tool LA may for example be a so-called dual stage type which has two substrate tables and two stations an exposure station and a measurement station between which the substrate tables can be exchanged.

Within the production facility, lithographic tool 100 forms part of a lithographic apparatus, otherwise referred to as a "litho cell" or "litho cluster", that contains also a coating apparatus 108 for applying photosensitive resist and other coatings to substrates W for patterning by the lithographic tool 100. At an output side of lithographic tool 100, a baking apparatus 110 and developing apparatus 112 are provided for developing the exposed pattern into a physical resist pattern. Between all of these apparatuses, substrate handling systems take care of supporting the substrates and transferring them from one piece of apparatus to the next. These apparatuses, which are often collectively referred to as the track, are under the control of a track control unit which is itself controlled by a supervisory control system SCS, which may also control (partially) the lithographic apparatus via lithographic apparatus control unit LACU. Thus, the different apparatus can be operated to maximize throughput and processing efficiency. Supervisory control system SCS receives recipe information R which provides in great detail a definition of the steps to be performed to create each patterned substrate.

Once the pattern has been applied and developed in the litho cell, patterned substrates 120 are transferred to other processing apparatuses such as are illustrated at 122, 124, 126. A wide range of processing steps is implemented by various apparatuses in a typical manufacturing facility. For the sake of example, apparatus 122 in this embodiment is an etching station, and apparatus 124 performs a post-etch annealing step. Further physical and/or chemical processing steps are applied in further apparatuses, 126, etc. Numerous types of operation can be required to make a real device, such as deposition of material, modification of surface material characteristics (oxidation, doping, ion implantation etc.), chemical-mechanical polishing (CMP), and so forth. The apparatus 126 may, in practice, represent a series of different processing steps performed in one or more apparatuses. As another example, apparatus and processing steps may be provided for the implementation of self-aligned multiple patterning, to produce multiple smaller features based on a precursor pattern laid down by the lithographic apparatus.

As is well known, the manufacture of semiconductor devices involves many repetitions of such processing, to build up device structures with appropriate materials and patterns, layer-by-layer on the substrate. Accordingly, substrates 130 arriving at the litho cluster may be newly prepared substrates, or they may be substrates that have been processed previously in this cluster or in another apparatus entirely. Similarly, depending on the required processing, substrates 132 on leaving apparatus 126 may be returned for a subsequent patterning operation in the same litho cluster, they may be destined for patterning operations in a different cluster, or they may be finished products to be sent for dicing and packaging.

Each layer of the product structure requires a different set of process steps, and the apparatuses 126 used at each layer may be completely different in type. Further, even where the processing steps to be applied by the apparatus 126 are nominally the same, in a large facility, there may be several supposedly identical machines working in parallel to perform the step 126 on different substrates. Small differences in set-up or faults between these machines can mean that they influence different substrates in different ways. Even steps that are relatively common to each layer, such as etching (apparatus 122) may be implemented by several etching apparatuses that are nominally identical but working in parallel to maximize throughput. In practice, moreover, different layers require different etch processes, for example chemical etches, plasma etches, according to the details of the material to be etched, and special requirements such as, for example, anisotropic etching.

The previous and/or subsequent processes may be performed in other lithography apparatuses, as just mentioned, and may even be performed in different types of lithography apparatus. For example, some layers in the device manufacturing process which are very demanding in parameters such as resolution and overlay may be performed in a more advanced lithography tool than other layers that are less demanding. Therefore some layers may be exposed in an immersion type lithography tool, while others are exposed in a 'dry' tool. Some layers may be exposed in a tool working at DUV wavelengths, while others are exposed using EUV wavelength radiation.

In order that the substrates that are exposed by the lithographic apparatus are exposed correctly and consistently, it is desirable to inspect exposed substrates to measure properties such as overlay errors between subsequent layers, line thicknesses, critical dimensions (CD), etc. Accordingly a manufacturing facility in which litho cell LC is located also includes metrology system which receives some or all of the substrates W that have been processed in the litho cell. Metrology results are provided directly or indirectly to the supervisory control system SCS. If errors are detected, adjustments may be made to exposures of subsequent substrates, especially if the metrology can be done soon and fast enough that other substrates of the same batch are still to be exposed. Also, already exposed substrates may be stripped and reworked to improve yield, or discarded, thereby avoiding performing further processing on substrates that are known to be faulty. In a case where only some target portions of a substrate are faulty, further exposures can be performed only on those target portions which are good.

Also shown in FIG. 1 is a metrology system 140 which is provided for making measurements of parameters of the products at desired stages in the manufacturing process. A common example of a metrology system in a modern lithographic production facility is a scatterometer, for example an angle-resolved scatterometer or a spectroscopic scatterometer, and it may be applied to measure properties of the developed substrates at 120 prior to etching in the apparatus 122. Using metrology system 140, it may be determined, for example, that important performance parameters such as overlay or critical dimension (CD) do not meet specified accuracy requirements in the developed resist. Prior to the etching step, the opportunity exists to strip the developed resist and reprocess the substrates 120 through the litho cluster. The metrology results 142 from the metrology system 140 can be used to maintain accurate performance of the patterning operations in the litho cluster, by supervisory control system SCS and/or control unit LACU 106 making small adjustments over time, thereby minimizing the risk of products being made out-of-specification, and requiring re-work.

Increasingly, apparatus such as metrology system 140 are integrated within the lithographic apparatus 100, providing integrated metrology within the lithographic process. However, this integration can result in a throughput or productivity impact of the whole lithographic apparatus which can be difficult to predict. Additionally, the sampling of substrates within the integrated apparatus may be insufficient, as it can be difficult for the metrology system to keep up with the lithographic tool output.

It is therefore proposed to provide a simulation model which is operable to:
acquire throughput information associated with a throughput of a plurality of substrates within a lithographic apparatus, said throughput information comprising a throughput parameter; predict the throughput of the metrology system using the throughput parameter as input parameter. The simulation model may be calibrated using the acquired throughput information and/or be used to determine the throughput impact of at least one change of a throughput parameter.

It is to be noted that the term throughput information will be used in the following to refer to any information associated with the throughput of the metrology system or the lithographic apparatus. By way of example, this may include, but is not limited to, throughput numbers for the lithographic apparatus and/or the metrology system, and sampling performance, i.e. the quantity of successfully sampled substrates, of the lithographic apparatus.

The simulation model, in an embodiment, may perform simulation on historical data from the lithographic apparatus. The historical data may be conditioned or extrapolated prior to being used as an input to the simulation. The data input to the simulation may comprise statistical data. This may be derived from historical data, future production plans, and/or from equipment throughput roadmaps. Such simulations may be performed off-line, with the results used in subsequent lithographic processes.

Alternatively, in an embodiment, the simulation model may operate on-line during lithographic processing and metrology of substrates. In such an embodiment, the results can be used in real-time monitoring and control of the lithographic and metrology processes.

The throughput simulator disclosed herein may be implemented in a SCS or LACU as shown in FIG. 1, or any other suitable controller/control module (e.g. litho cluster equipment controller or litho cell controller). Alternatively it may be implemented in a manufacturer's Manufacturing Execution System (MES). In a further alternative embodiment the throughput simulator may be implemented in a controller of the metrology system.

Figure 2:
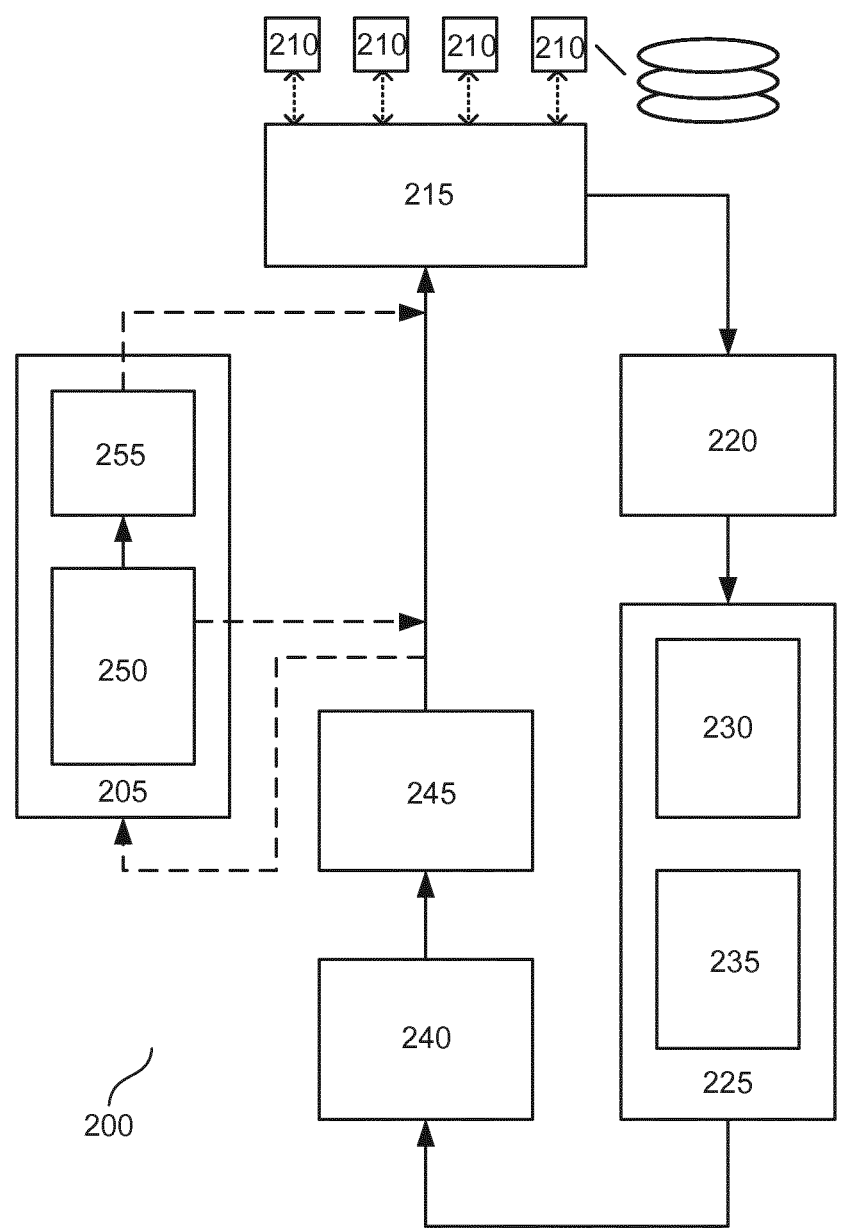
FIG. 2 depicts in more detail a lithographic apparatus with integrated metrology system, and further illustrates the processes a substrate may be subject to through such a lithographic apparatus.

FIG. 2 illustrates in more detail a lithographic apparatus 200 with integrated metrology system 205 (essentially a fully integrated litho cluster), and further illustrates the processes a substrate may be subject to through such a lithographic apparatus 200. Substrates are introduced into the lithographic apparatus 200 via boxes known as FOUPs (Front Opening Unified Pod) 210. These are sealed boxes which protect the substrates from contamination from the environment. Each FOUP 210, at the beginning of the lithographic process, comprises a number of unprocessed substrates. By the end of the process, when all of the substrates introduced by the FOUP 210 have been processed (and, in some cases, measured), the processed substrates are returned to the FOUP 210. The FOUPs containing the processed substrates are then transported for further processing (e.g., cutting and packaging). Conventionally, each FOUP may contain 25 substrates, although this number can vary. Substrates are usually processed in lots, each lot comprising 1 or more substrates. It may be that a substrate lot will be the contents of a single FOUP.

Firstly, a new FOUP 210 is introduced to interface block 215, and the unprocessed substrates are unloaded. Each of these substrates undergoes a coating step 220, where they are coated with photoresist. The coated substrates are then passed to the lithographic tool 225. In this example, the lithographic tool has a metrology side 230 for performing initial alignment and other positional measurements, and a lithography side 235 where the actual lithographic patterning is performed. Following this, the substrates undergo a bake step 240 and a development step 245. The substrate may then be returned to the interface block 215 and FOUP 210. However, some substrates, following the development step 245, may be measured by the metrology system 205. The metrology system may comprise a metrology buffer 250 and a metrology tool 255. Processed substrates may be queued in the metrology buffer 250 until the metrology tool 255 is able to measure them. Once measured, the substrates are returned to the interface block 215 and FOUP 210. In certain circumstances (as will be described), substrates may be returned to the interface block 215 directly from the metrology buffer 250 without being measured. In addition to metrology buffer 250, there may also be a return path buffer or FOUP buffer (not shown) in which substrates may be queued on their return path, before being returned to a FOUP 210.

The number of substrates measured will impact throughput of the lithographic apparatus 200 as a whole. The FOUPs 210 can only be closed and unloaded when all of the processed substrates have been returned. However, accuracy of the lithographic processes may improve with increasing number of measurements, both in terms of number of substrates measured and number of measurements per substrate. Ideally, it would be preferred that all substrates were measured, with dense sampling per substrate. However, this would be impractical. As well as throughput being unacceptably low for such a scheme, the metrology buffer 250 would not be able to queue the substrates prior to measurement (unless it were to be made impractically large). The metrology buffer 250 can only have a finite number of slots, and it cannot accept any further substrates if all slots are filled. Similar limitations apply also to the FOUP buffer.

Consequently, it can be difficult to make decisions regarding throughput parameters (variable parameters which will affect throughput of the lithographic apparatus as a whole). Such throughput parameters may include, but are not limited to, one or more of the following: number of substrates per substrate lot measured; which substrates per lot are measured; number and/or type of measurement per substrate; lot size. There may be significant flexibility in varying these throughput parameters to provide alternative measurement schemes, with variation possible on a per lot and per substrate basis. For example, it may be that, within a lot, a subset of the substrates scheduled for measurement is sampled more densely than other substrates scheduled for measurement. Alternatively, or in addition, the same subset or another subset of measured substrates may have different measurements performed thereon compared to the other measured substrates within the lot or of other lots; for example it may be that focus measurements are performed on only a subset of the measured substrates. It may be that different lots are measured differently. Some lots may be designated as high priority and will always be measured (possibly with an increased number of measurements or of measured substrates). Other lots may have no measurements performed on them at all.

Figure 3:
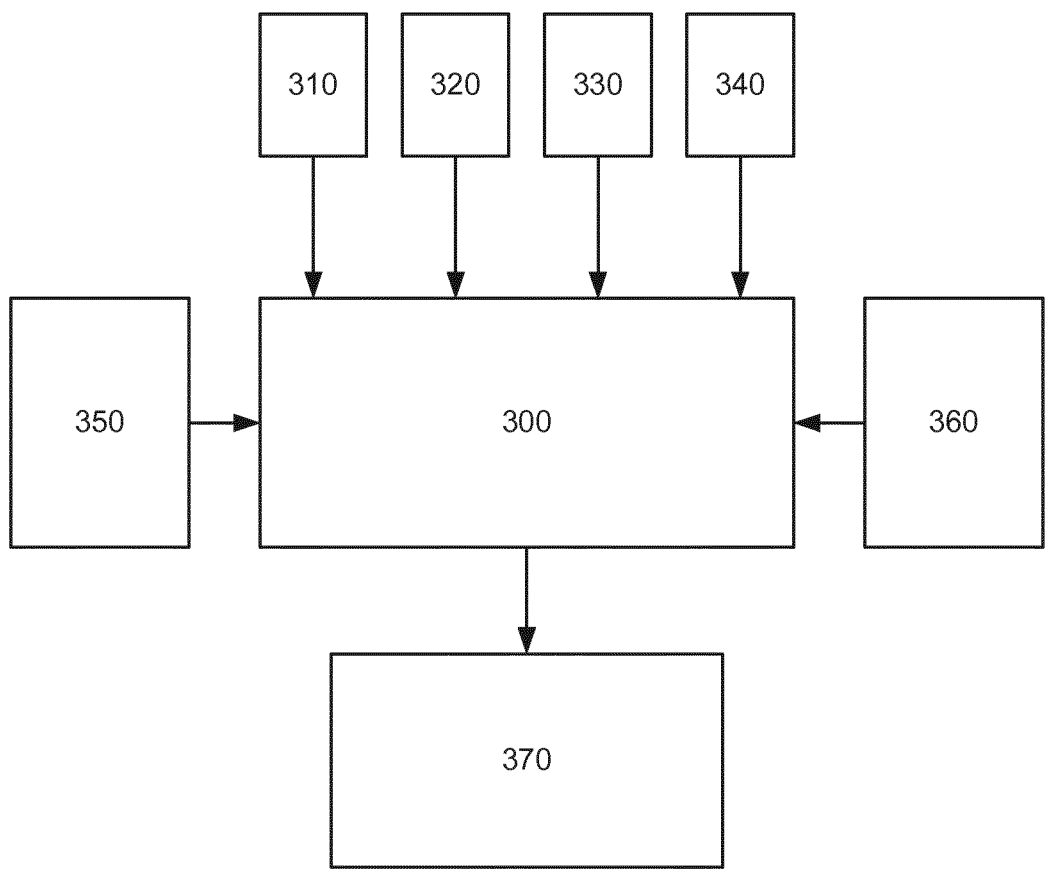
FIG. 3 illustrates a conceptual overview of a throughput simulator.

FIG. 3 illustrates a conceptual overview of a throughput simulator 300, showing a possible listing of input and output. The inputs may include an indication of productive time 310, of lot size 320, of lot throughput 330 and of measurement sample and time 340. Each of these inputs may be provided in the form of average or typical values obtained from historical data, from statistical data or from real-time data. This input data may be obtained from random or actual production sequences, and may take the form of probability distributions in a specific embodiment. Other inputs include the automation rules 350 and the equipment knowledge 360. Examples of equipment knowledge may include, but are not limited to, one or more of the following: substrate throughput numbers per hour (per measurement scheme), substrate handling speeds, buffer sizes (metrology buffer and return path buffer), metrology overhead. Automation rules 350 may comprise any suitable rules which govern the simulator's operation. These rules may be configurable. The rules may include different measurement schemes (varied for example on per substrate and/or per lot basis), or which lots are to be measured. It may be decided, for example, that lots comprising fewer than a threshold number of substrates are not to be measured. Other lots may be designated as priority lots, the measurement of which cannot be skipped. Priority lots may also have specific measurement schemes attributed thereto, with more substrates measured, and/or more measurements per substrate. Different "skip modes" can also be designated, for example the skip modes may comprise "skip lots" or "skip substrate". Skip modes will be described in more detail below. It will be appreciated that automation rules can take many different forms, and only a few limited examples have been described here.

The simulator output 370, may take the form (in an embodiment) of a key performance indicator. The key performance indicator may provide an indication of the acceptability of a particular measurement scheme. Examples of key performance indicators may include, for example, a measure of utilization of the lithographic apparatus, the potential throughput impact of a measurement scheme, a prediction on the sampling performance of a measurement scheme or another evaluation of the measurement scheme. Such an evaluation may be, for example, in terms of one or more of: number of substrates measured per lot; number of lots measured; number of lots skipped (partially or entirely), measurement time utilized, (e.g., as percentage of total time), number of points measured per substrate; types of measurements made per substrate/per lot (e.g., overlay, critical dimension, focus), whether sampling is fixed or whether there is flexible flow/variable sampling. In another, embodiment, the lithographic apparatus may be controlled in real-time on the basis of this output. In another embodiment, one or more optimized measurement schemes may be output, based on certain constraints (e.g., minimum number of substrates measured, minimum number of measurements per substrate, particular types of measurements required). The output may be provided tabulated or in a visual manner (for example as an animation) to enable better visualization and identification of problem areas. The simulator 300 may be based on any concept that is used in industrial automation applications; It may be a "discrete event simulator" or a "real time" simulator where continuous monitoring of input parameters takes place. Typically for predicting machine availability and throughput "discrete event" based methods are preferred; also because they are computationally more efficient. A good introduction into discrete event simulation methodologies is for example given in "Discrete-Event Simulation", G. S. Fisherman, 2001, ISBN 978-1-4419-2892-4.

Figure 4:
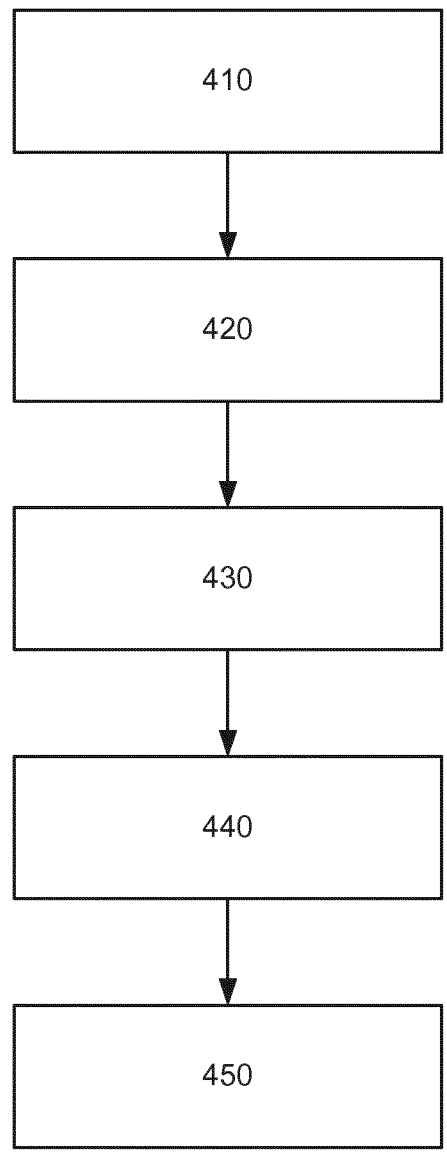
FIG. 4 depicts a method of predicting performance of a metrology system according to an exemplary embodiment.

FIG. 4 is a flow diagram illustrating a method of predicting performance of a metrology system, according to an exemplary embodiment. The steps are as follows, and are then described in greater detail thereafter:

410—Generate substrate input flow.
420—Select substrates for measurement.
430—Simulate measurement time.
440—Simulate metrology buffer usage.
450—Simulate substrate throughput and/or restrictions thereon.

At step 410, the substrate input flow is generated. This flow will depend on parameters relating to the processing time (including steps such as patterning within the lithographic tool and other substrate processing steps as already described). Such parameters may include and/or depend on (for example) the product being patterned and its complexity, the patterning techniques used, number of substrates per lot.

At step 420, substrates are selected for measurement with the measurement tool. Different lots may have a different number of substrates measured. Some lots may have no substrates measured. The simulation can be performed with different measurement schemes, each differing in the number of substrates measured, such that a number of different candidate measurement schemes can be evaluated.

At step 430, measurement time of a substrate is simulated. This will depend on the number of measurements made per substrate and the types of measurements made (e.g., overlay, critical dimension, focus/dose). Different substrates may have different measurements, or different numbers of measurements performed thereon. This may depend on a per substrate, per lot, or a combination of a per substrate and a per lot based approach. The simulation can be performed with different measurement schemes, each differing in the number and/or type of measurements measured per substrate, such that a number of different candidate measurement schemes can be evaluated.

At step 440, the metrology buffer and/or FOUP buffer usage is simulated. The example below is described in terms of the metrology buffer, although it should be clear that its teachings are equally applicable to simulation of the FOUP buffer. The measurement of a substrate may take a significant time period, considerably longer then the processing of the substrate (which is why it is not always feasible to measure all substrates). It may be that that only one metrology system is available and that only one substrate can be measured at a time. As such, substrates selected for measurement may have to spend time queued in the metrology buffer while a substrate ahead of it is undergoing measurement. The metrology buffer will only have a finite number of buffer slots, and therefore only a finite number of substrates can be queued for measurement at any one time. There may be any number of slots, depending on the configuration; however, this buffer should be simulated as its occupancy may impact whether a particularly sampling scheme is feasible or whether it will result in one or more skipped substrates (including skipped lots). A skipped substrate may be a substrate originally scheduled for measurement (according to the measurement scheme), but for which there was no free slot to queue it after it had been processed. Such a substrate will then be forwarded to the FOUP without measurement. Substrates may also be skipped even though there is a free slot in the metrology buffer. This may happen when it is determined that skipping the substrate will prevent fewer substrates being skipped overall and/or it is determined that skipping the substrate will prevent fewer lots having any substrates skipped. This will be described in greater detail below.

At step 450, substrate throughput can be calculated for the measurement scheme being simulated. Other key performance indicators or output can be calculated as previously described.

Figure 5:
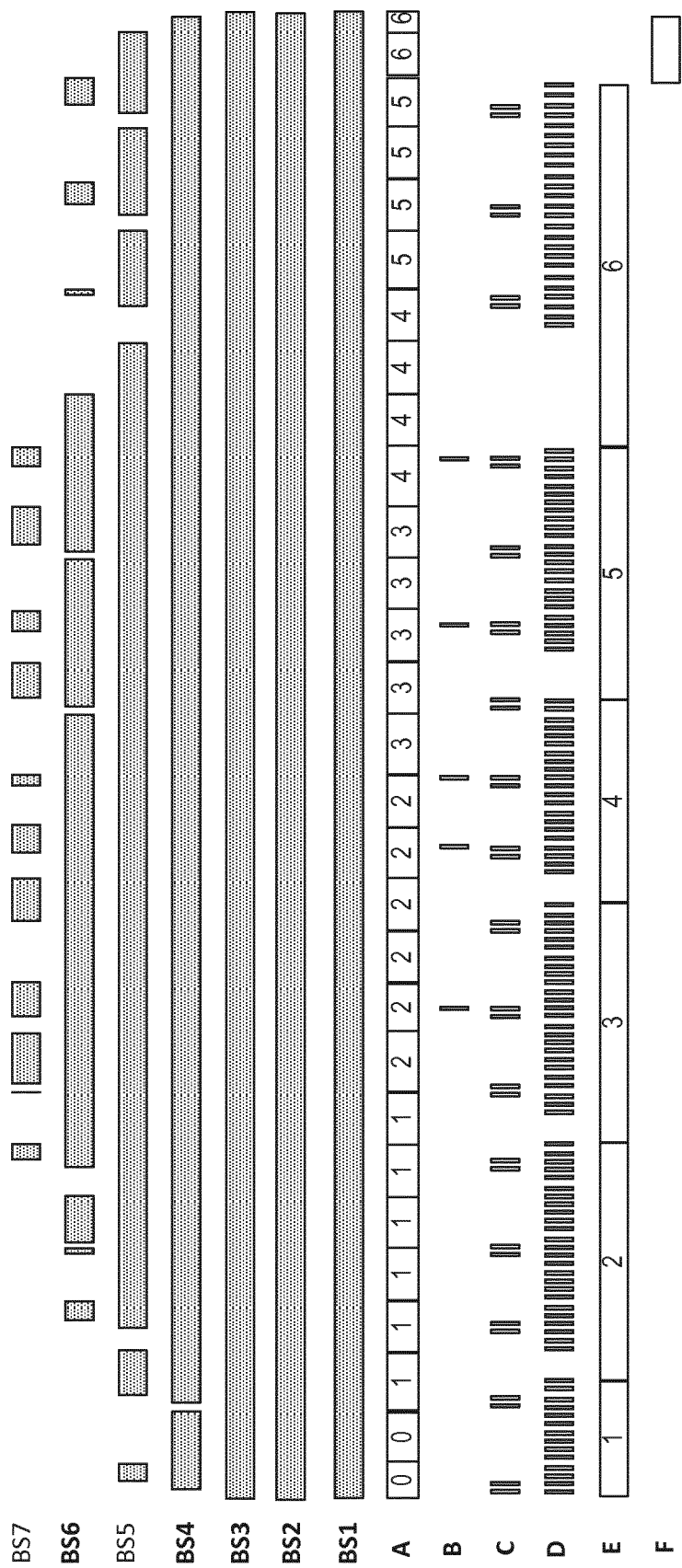
FIG. 5 is a graphical illustration of the simulation steps of FIG. 4.

FIG. 5 is a graphical illustration of the simulation steps of FIG. 4, according to an embodiment. Rows BS1-BS7 represent the buffer slots. Shading is used to illustrate that a slot is occupied. These rows essentially illustrate simulation step 440. While this example shows 7 metrology buffer slots, this will depend on the actual apparatus and is shown by way of example only.

Row D shows the processed substrates following development (see FIG. 2), and Row E shows the same in term of lots. In the specific example shown here, 6 lots are shown (lots 1 to 6 as numbered), with for example, lot 2 comprising 25 substrates. These rows essentially illustrate simulation step 410. Row C illustrates substrates which have been selected for measurement. This row essentially illustrates simulation step 420. Row A illustrates the occupancy of the metrology tool. Here, there is only one metrology tool, and therefore only one substrate can be measured at a single moment. The number within each block indicates from which lot the substrate being measured belongs. This row essentially illustrates simulation step 430. Row B indicates substrates scheduled for measurement which are skipped due to there being no free slots available in the metrology buffer. Row F illustrates idle time of the lithographic apparatus.

As can be seen in the specific example highlighted in FIG. 5, five substrates have required skipping. These include 1 substrate from lot 2, 2 substrates from lot 3 and 2 substrates from lot 4. In an embodiment, it may be preferred that a lot is skipped in its entirety when at least one substrate of that lot needs to be skipped due to there being no metrology buffer slot available. This can result in fewer lots having skipped substrates. It is sometimes preferable to maximize the number of lots measured fully as scheduled, at the cost of one lot being skipped in its entirety, rather than having numerous lots only partially measured with respect to the schedule. The skip lot rule may comprise performing the following steps when a substrate which is scheduled to measured cannot be accommodated within the metrology buffer:

Skip the substrate which cannot be accommodated (move to a FOUP).

Remove all queued substrates which belong to the same lot as the skipped substrate from the metrology buffer (move to a FOUP). If a substrate from this lot is actually being measured at this time, then completion of the measurement may be permitted. Alternatively, the measurement may be aborted and the substrate moved to a FOUP.

Skip all subsequent substrates from this lot.

By following this method, a number of slots may be freed by substrates being removed from the metrology buffer queue. With these slots freed, (at least the next few) subsequent lots may be measured according to the metrology scheme. In an embodiment, it may be a configurable rule whether whole lots or individual substrates are to be skipped when a substrate cannot be accommodated in the metrology buffer; e.g., a skip mode can be set to either skip lots or skip substrates. In either case, some lots may be designated priority lots for which no substrates are to be skipped, even if this results in ejection of one or more queued substrates of another lot from the metrology buffer to accommodate them.

Referring again to the example of FIG. 5, when the first skip is necessary (lot 3), the three queued substrates from this lot are removed from the metrology buffer, and the following two substrates which are scheduled to be measured are skipped. This results in there being 5 additional slots free as lot 4 becomes available, compared to the situation where only the single substrate of lot 3 is skipped. As a result there is no longer any need for skipped substrates in lot 4 or lot 5, and the measurement of only one lot has had to deviate from the measurement scheme, rather than three lots.

The throughput simulator can be used for checking and evaluation of any proposed integrated metrology measurement scheme. Such an evaluation can take into account many factors. Optimal measurement schemes may, for example, be identified based on one or more of the following key performance indicators: the best throughput of metrology system and/or lithographic apparatus, greatest utilization of the metrology system given available lithographic apparatus time, fewest skipped substrates, fewest lots with skipped substrates. The throughput simulator can also be used to prioritize measurement schemes. Such prioritizing may ensure that the most critical measurements are always performed, while less critical measurements may be performed only when time is available. Simulation of metrology buffer queueing can be made to optimize queueing to ensure that critical measurements are always made. Measurement schemes can also be evaluated to ensure that there are always sufficient metrology buffer slots available before priority lots are to be measured. The throughput simulator can also be used to predict idle time (Row F of FIG. 5), during which maintenance actions can be scheduled, for example. In an embodiment, an optimal equipment plan can be predicted. Such a plan may, for example, predict an optimal number of integrated metrology/lithography apparatuses versus the number of stand-alone metrology systems, to maximize measurement capacity versus cost.

Although specific reference may have been made above to the use of embodiments of the invention in the context of optical lithography, it will be appreciated that the invention may be used in other applications, for example imprint lithography, and where the context allows, is not limited to optical lithography. In imprint lithography, a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used in relation to the lithographic apparatus encompass all types of electromagnetic radiation, including ultraviolet (UV) radiation (e.g., having a wavelength of or about 365, 355, 248, 193, 157 or 126 nm) and extreme ultra-violet (EUV) radiation (e.g., having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

The invention may further be described using the following clauses:

1. A method of predicting a throughput of a metrology system in a lithographic apparatus comprising the metrology system, the method comprising the steps of:

acquiring throughput information associated with a throughput of a plurality of substrates within the lithographic apparatus, said throughput information comprising a throughput parameter;

predicting the throughput of the metrology system, using a throughput simulator having the throughput parameter as an input parameter.

2. A method according to clause 1, wherein the throughput parameter comprises a parameter selected from a list comprising: a number of substrates per lot measured, a selection of substrates requiring to be measured per lot, a number of measurements per substrate or per lot, a type of measurement per substrate or per lot, and a lot size.

3. A method according to clause 1 or 2, wherein the throughput simulator is configured to determine a throughput impact caused by a change of the throughput parameter.

4. A method according to any of clauses 1 to 3, wherein the method further comprises a step of calibrating the throughput simulator using the throughput information.

5. A method according to any preceding clause, wherein the throughput simulator is configured for considering the throughput information to predict a measurement time of the metrology system.

6. A method according to any preceding clause, wherein the throughput information comprises at least one measurement scheme determining which measurements are to be performed and/or which substrates out of said plurality of substrates are to be measured.

7. A method according to clause 6, wherein the determination of which measurements are to be performed comprises an indication of a number of measurements to be performed and/or of a type of measurements to be performed.

8. A method according to clause 6 or 7, wherein said measurement scheme determines different measurements to be performed depending on the substrate being measured.

9. A method according to any of clauses 6 to 8, wherein the lithographic system comprises a metrology buffer, the metrology buffer having a number of substrate buffer slots, and wherein the step of predicting the throughput of the metrology system comprises simulating the performance of the metrology buffer.

10. A method according to clause 9, wherein the step of simulating the performance of the metrology system buffer comprises simulating the occupancy status of the substrate buffer slots, the occupancy status describing whether a substrate buffer slot is occupied or not occupied by a substrate.

11. A method according to clause 9 or 10, wherein said method comprises optimization of the measurement scheme for optimizing metrology buffer usage.

12. A method according to clause 11, wherein optimization of metrology buffer usage is configured for minimizing the number of skipped substrates unable to be measured due to the occupation of the substrate buffer slots, the skipped substrates being substrates originally scheduled for measurement.

13. A method according to clause 11, wherein the plurality of substrates is divided into a plurality of substrate lots to be processed by the lithographic apparatus, each substrate lot comprising a subset of said plurality of substrates; and said optimization of metrology buffer usage minimizes the number of skipped substrate lots unable to be measured due to occupation of the substrate buffer slots, the skipped substrate lots being substrate lots originally scheduled for measurement.

14. A method according to clause 13, wherein said optimization of metrology buffer usage comprises configuring said throughput simulator to skip all other substrates of a specific lot when one substrate of said specific lot is to be skipped due to unavailability of a substrate buffer slot.

15. A method according to any of clauses 11 to 14, wherein said optimization of metrology buffer usage is configured for always measuring substrates designated high priority substrates.

16. A method according to any preceding clause, wherein the step of predicting throughput of the metrology system comprises predicting an impact on the throughput of the lithographic apparatus due to the presence of the metrology system.

17. A method according to any preceding clause, wherein the throughput simulator is configured to calculate a key performance indicator.

18. A method according to clause 17, wherein the key performance parameter comprises one or more of the parameters selected from a list comprising: best throughput of the metrology system, best throughput of the lithographic apparatus, highest utilization of the metrology system given available lithographic apparatus time, fewest skipped substrates, and fewest skipped lots.

19. A method according to any of the clauses 6 to 12, wherein said method comprises performing an evaluation on said measurement scheme.

20. A method according to clause 19, wherein said evaluation comprises evaluating one or more of the following throughput parameters:
the number or proportion of said plurality of substrates measured;
the number or proportion of substrates unable to be measured while scheduled for measurement;
the number or proportion of substrate lots unable to be measured while scheduled for measurement;
the number of measurements performed or to be performed on a given substrate;
the type of measurements performed or to be performed on a given substrate;
the throughput of the metrology system;
the throughput of the lithographic apparatus;
the utilization time of the metrology system;
whether substrates designated as higher priority are measured;
the substrate delay time as a result of performing measurements on the substrate.

21. A method according to clause 19 or 20, wherein said evaluation comprises ensuring the measurement scheme meets at least one criterion.

22. A method according to clause 21, wherein said at least one criterion comprises determining whether at least one of said throughput parameters meets a threshold.

23. A method according to any of clauses 6 to 22, comprising performing said method for different measurement schemes and evaluating said different measurement schemes against each other to identify an optimal measurement scheme.

24. A method according to any of clauses 6 to 22, comprising optimizing said measurement scheme given one or more set constraints.

25. A method according to clause 24, wherein said set constraints comprise one or more of the following:
maintaining that a number or proportion of said plurality of substrates measured is above a threshold; maintaining that a number or proportion of substrates scheduled for measurement which cannot be measured is below a threshold;
maintaining that a number or proportion of substrate lots for which a substrate scheduled for measurement cannot be measured is below a threshold;
maintaining that a number of measurements on a given substrate is above a threshold;
ensuring that certain types of measurements are performed on a given substrate;
maintaining a throughput of the metrology system above a threshold;
maintaining a throughput of the lithographic apparatus above a threshold;
maintaining a utilization time of the metrology system above a threshold;
ensuring that substrates pre-designated as higher priority are always measured; maintaining that the substrate delay time as a result of measurements is below a threshold.

26. A method according to any preceding clause, further comprising determining a time interval during which said metrology system is idle.

27. A method according to any preceding clause, wherein the throughput information comprises historical throughput information derived from at least one plurality of substrates previously processed by the lithographic apparatus.

28. A method according to any of clauses 1 to 26, wherein the throughput information comprises statistical throughput information.

29. A method according to clause 28, wherein said statistical throughput information is derived from at least one plurality of substrates previously processed by the lithographic apparatus.

30. A method according to clause 28, wherein said statistical throughput information is derived from future production plans.

31. A method according to any of clauses 1 to 26, wherein the throughput information comprises information relating to a plurality of substrates being processed by the lithographic apparatus, the information being received during processing of said plurality of substrates.

32. A method according to any preceding clause, comprising using the result of said predicting step in control of said lithographic apparatus for subsequent substrates.

33. A lithographic apparatus comprising metrology system, said lithographic apparatus being operable to perform the method of any preceding clause.

34. A lithographic apparatus according to clause 33, comprising a controller configured to perform the method of any of clauses 1 to 32.
35. A computer program product comprising machine readable instructions which, when run on a suitable processor, cause the processor to perform the method of any of clauses 1 to 32.
36. A metrology system being integrated within a lithographic apparatus, said metrology system being operable to perform measurements on substrates, and said metrology system comprising a controller configured to perform the method of any of clauses 1 to 32.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description by example, and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A method of predicting a throughput of a metrology system in a lithographic apparatus comprising the metrology system, the method comprising:
    acquiring throughput information associated with a throughput of a plurality of substrates within the lithographic apparatus, the throughput information comprising a throughput parameter, the throughput parameter comprising a parameter relating to processing other than, or in addition to, the measurement processing in the metrology system; and
    predicting the throughput of the metrology system, using a throughput simulator having the throughput parameter as an input parameter.

2. The method according to claim 1, wherein the throughput parameter comprises a parameter selected from: a number of substrates per lot measured, a selection of substrates requiring to be measured per lot, a number of measurements per substrate or per lot, a type of measurement per substrate or per lot, or a lot size.

3. The method according to claim 1, wherein the throughput simulator is configured to determine a throughput impact caused by a change of the throughput parameter.

4. The method according to claim 1, further comprising calibrating the throughput simulator using the throughput information.

5. The method according to claim 1, wherein the throughput simulator is configured to consider the throughput information to predict a measurement time of the metrology system.

6. The method according to claim 1, wherein the throughput information comprises at least one measurement scheme determining which measurements are to be performed and/or which substrates out of the plurality of substrates are to be measured.

7. The method according to claim 6, wherein the determination of which measurements are to be performed comprises an indication of a number of measurements to be performed and/or of a type of measurements to be performed.

8. The method according to claim 6, wherein the lithographic system comprises a metrology buffer, the metrology buffer having a number of substrate buffer slots, and wherein predicting the throughput of the metrology system comprises simulating the performance of the metrology buffer.

9. The method according to claim 8, wherein simulating the performance of the metrology system buffer comprises simulating the occupancy status of the substrate buffer slots, the occupancy status describing whether a substrate buffer slot is occupied or not occupied by a substrate.

10. The method according to claim 8, comprising optimization of the measurement scheme for optimizing metrology buffer usage.

11. The method according to claim 10, wherein optimization of metrology buffer usage is configured for minimizing a number of skipped substrates unable to be measured due to the occupation of the substrate buffer slots, the skipped substrates being substrates originally scheduled for measurement.

12. The method according to claim 10, wherein the plurality of substrates is divided into a plurality of substrate lots to be processed by the lithographic apparatus, each substrate lot comprising a subset of the plurality of substrates; and
    the optimization of metrology buffer usage minimizes a number of skipped substrate lots unable to be measured due to occupation of the substrate buffer slots, the skipped substrate lots being substrate lots originally scheduled for measurement.

13. The method according to claim 1, wherein predicting throughput of the metrology system comprises predicting an impact on the throughput of the lithographic apparatus due to the presence of the metrology system.

14. A non-transitory computer program product comprising machine readable instructions which, when run on a suitable processor system, cause the processor system to perform at least:
    acquire throughput information associated with a throughput of a plurality of substrates within a lithographic apparatus, the throughput information comprising a throughput parameter, the throughput parameter comprising a parameter relating to processing other than, or in addition to, the measurement processing in the metrology system; and
    predict a throughput of a metrology system in the lithographic apparatus, using a throughput simulator having the throughput parameter as an input parameter.

15. A metrology system integrated within a lithographic apparatus, the metrology system operable to perform measurements on substrates, and the metrology system comprising the computer program product of claim 14.

16. The computer program product according to claim 14, wherein the throughput parameter comprises a parameter selected from: a number of substrates per lot measured, a selection of substrates requiring to be measured per lot, a number of measurements per substrate or per lot, a type of measurement per substrate or per lot, or a lot size.

17. The computer program product according to claim 14, wherein the throughput simulator is configured to determine a throughput impact caused by a change of the throughput parameter.

18. The computer program product according to claim 14, wherein the throughput simulator is configured to consider the throughput information to predict a measurement time of the metrology system.

19. The computer program product according to claim 14, wherein the throughput information comprises at least one measurement scheme determining which measurements are to be performed and/or which substrates out of the plurality of substrates are to be measured.

20. The computer program product according to claim 14, wherein prediction of the throughput of the metrology system comprises prediction of an impact on the throughput of the lithographic apparatus due to the presence of the metrology system.

* * * * *